UNITED STATES PATENT OFFICE 2,256,625

STABILIZED VINYL RESIN

William Meritt Quattlebaum, Jr., Charleston, W. Va., assignor to Carbide and Carbon Chemicals Corporation, a corporation of New York No Drawing. Application December 13, 1938, Serial No. 245,375

9 Claims. (Cl. 260—86)

This invention is directed to improvements in those vinyl resins which may be formed by the polymerization of vinyl halides or by the conjoint polymerization of vinyl halides with other unsaturated and polymerizable compounds, examples of such compounds being vinyl esters, α,β-unsaturated acids or their esters, α,β-unsaturated ketones or aldehydes, and unsaturated hydrocarbons, such as the butadienes or the styrenes. The invention is of particular merit when applied to the vinyl resins made by the conjoint polymerization of vinyl chloride with vinyl esters of the lower aliphatic acids, as for instance, vinyl acetate.

Resins of the type defined above are known and have been suggested for different purposes in the art. Among other characteristics, such resins are distinguished by the property of thermoplasticity. In many applications this property is advantageous in that the resins may be softened by heating, and in this softened condition they may be molded into a variety of objects or they may be used as an adhesive for joining or stiffening various materials. Unfortunately, these artificial resins do not possess unlimited stability towards heat at temperatures above their softening points. Because of this, the use of these resins where a high degree of resistance to heat is required is necessarily limited.

Decomposition of the resins at temperatures above their softening point is usually initiated by the development of color in the resins. This stage is shortly followed by charring of the resins and the evolution of gaseous products of decomposition from the mass. Because of the acidic nature of the decomposition products, it was postulated early in the development of these resins that the addition of basic substances to the resins should inhibit their thermal decomposition. Such proved to be the case and a number of basic stabilizing agents have been suggested, among which may be mentioned lead stearate, calcium stearate, calcium hydroxide, basic lead carbonate and triethanolamine. The most effective of such compounds from every viewpoint proved to be the basic metal soaps of the fatty acids, and, of such compounds, lead and calcium stearates and oleates have come into very common use as stabilizing agents for these resins. These compounds have proved effective in prolonging the color-free state of the resins, but they have not proved particularly effective in stabilizing the resins against the second, and more serious, type of decomposition. In fact, on heating the resins in the presence of the known stabilizing agents, actual degradation of the resins begins shortly after the development of color in the resins.

A new class of heat stabilizing compounds has now been developed which, when the resins are subjected to heat, not only prolong the color-free period of the resins but also markedly increase the resistance of the resins to molecular decomposition. These compounds are alkaline earth derivatives of aliphatic and aromatic alcohols, including phenols, in which one mol of the alkaline earth metal is bound to two mols of the alcohol or phenol radical by a replacement of the hydroxyl hydrogen of the alcohol or phenol. Such compounds may be termed alcoholates or phenolates. They differ profoundly from the metal soaps in that the compounds of this invention are derivatives of alcohols or phenols whereas the metal soaps are derivatives of fatty acids. The stabilizing compounds of this invention may be represented by the following structural formula,

where X is an alkaline earth metal and R is one of the group of aliphatic and aromatic univalent hydrocarbon radicals.

As examples of the alkaline earth metal alcoholates or phenolates of this invention may be mentioned, calcium methylate, calcium ethylate, calcium propylate, calcium 2-ethyl hexylate, calcium phenolate, calcium naphtholate, calcium cresolate, calcium eugenolate, and similar derivatives of barium, magnesium and strontium. These compounds may be prepared by reacting the alkaline earth metal with the corresponding aliphatic or aromatic alcohol or phenol.

The stabilizing agent may be incorporated with the vinyl halide resin by a variety of methods, such as, for example, by milling the ingredients, or by dissolving the stabilizing agent in a solution of the resin and subsequently recovering the stabilized resin.

The manner of preparation as well as the effectiveness of these compounds as heat stabilizing agents for vinyl halide resins will be more clearly demonstrated by the following examples:

*Example 1*

Calcium metal was heated with an excess of 2-ethyl-hexanol in a flask provided with a reflux condenser until the calcium had reacted. The resulting solution was quickly filtered to remove unreacted metal and the calcium 2-ethyl hexylate recovered by vacuum evaporation of the filtrate. It is preferred to carry out these operations in the absence of excessive quantities of air and to retain the product in a tightly closed container. The alcoholates are quite reactive with the ordinary contents of air, such as moisture and carbon dioxide, and it has been observed that their effectiveness as stabilizing agents for vinyl resins is diminished by excessive contact with air.

The alcoholate formed was incorporated, by milling, with a vinyl resin formed by the conjoint polymerization of vinyl chloride with vinyl acetate and containing about 87% vinyl chloride in the polymer. The stabilizing agent formed 2% by weight of the well-mixed composition.

The composition was unusually stable towards thermal decomposition. After 16 hours heating at 135° C. the composition was lighter in color and showed less decomposition than a portion of the same resin containing a like amount of calcium stearate after only three hours heating at the same temperature. The calcium stearate stabilized resin was badly charred after heating at this temperature for 16 hours.

Example 2

Calcium metal was carefully reacted with an excess of methanol to avoid too violent a reaction. Calcium methylate was recovered from the reactants and dried under reduced pressure. Care was taken to avoid exposing the product to air.

It was noted that small amounts of the product incorporated with the vinyl halide resin of Example 1 also increased the ultimate stability of the resin to an unusual degree. It was observed that initial grinding of the calcium methylate into the vinyl resin on the master batch principle prior to the final milling resulted in marked improvement in the clarity of the finished product.

Example 3

The calcium methylate used in this example was prepared by the reaction of granular calcium carbide with methanol. The product formed in this manner was about as effective as that made by the process of Example 2.

The following test illustrates the remarkable improvement in the ultimate heat stability which even small amounts of an alkaline earth alcoholate impart to the vinyl halide resins.

| Composition | Time required for initial evolution of acid decomposition products on heating at 154° C. |
|---|---|
| | Hours |
| Unstabilized vinyl halide resin [1] | 0.5 |
| Vinyl halide resin [1] +2% calcium methylate of Example 2 | 9.0 |
| Vinyl halide resin [1] +2% calcium methylate of Example 3 | 8.5 |

[1] This resin was the same as that described in Example 1.

The amount of the heat stabilizing agents of this invention which may be used is limited only by the effect of the agent upon the physical properties of the vinyl resin. Generally speaking, the degree of heat stability imparted to the vinyl resins will be a direct function of the amount of agent present. Practically speaking, however, it is desirable to use no more of the heat stabilizing agent than is required for the problem at hand. In most instances, the amounts needed will be between about 0.5% and about 10% by weight of the resin.

The foregoing specific examples are given solely by way of illustration and the invention is not limited thereby. Modifications of the stabilizers and their preparation and use will be apparent and such modifications are included within the scope of the invention as defined by the appended claims.

I claim:

1. A composition resistant to the deteriorating effects of heat comprising an artificial thermoplastic resin, including a vinyl halide polymerized therein, intimately combined with a small amount of a stabilizing compound of the formula

where X is an alkaline earth metal and R is one of the group of aliphatic and aromatic univalent hydrocarbon radicals.

2. A composition resistant to the deteriorating effects of heat comprising a conjoint polymer of a vinyl halide with another polymerizable substance intimately combined with a small amount of a stabilizing compound of the formula

where X is an alkaline earth metal and R is one of the group of aliphatic and aromatic univalent hydrocarbon radicals.

3. A composition resistant to the deteriorating effects of heat comprising an artificial thermoplastic resin, including a vinyl halide polymerized therein, intimately combined with a small amount of a calcium aliphatic alcoholate.

4. A composition resistant to the deteriorating effects of heat comprising a vinyl resin substantially identical with that resulting from the conjoint polymerization of a vinyl halide with a vinyl ester of an aliphatic acid intimately combined with a small amount of a stabilizing compound of the formula

where X is an alkaline earth metal and R is one of the group of aliphatic and aromatic univalent hydrocarbon radicals.

5. A composition resistant to the deteriorating effects of heat comprising a vinyl resin substantially identical with that resulting from the conjoint polymerization of a vinyl halide with a vinyl ester of an aliphatic acid intimately combined with from about .5% to about 10% by weight of a calcium aliphatic alcoholate.

6. A composition resistant to the deteriorating effects of heat comprising a vinyl resin substantially identical with that resulting from the conjoint polymerization of vinyl chloride with vinyl acetate intimately combined with from about .5% to about 10% by weight of a calcium aliphatic alcoholate.

7. A composition resistant to the deteriorating effects of heat comprising a vinyl resin substantially identical with that resulting from the conjoint polymerization of vinyl chloride with vinyl acetate intimately combined with a small amount of calcium methylate.

8. A composition resistant to the deteriorating effects of heat comprising a vinyl resin substantially identical with that resulting from the conjoint polymerization of vinyl chloride with vinyl acetate intimately combined with a small amount of calcium 2-ethyl hexylate.

9. Process for making a vinyl resin composition resistant to the deteriorating effects of heat which comprises intimately combining a vinyl resin, including a vinyl halide polymerized therein, with from about .5% to about 10% by weight of the stabilizing compound of the formula

where X is an alkaline earth metal and R is one of the group of aliphatic and aromatic univalent hydrocarbon radicals.

WILLIAM MERITT QUATTLEBAUM, Jr.